R. B. Lockwood.
Disinfecting App's.
Nº 60,394. Patented Dec. 11, 1866.
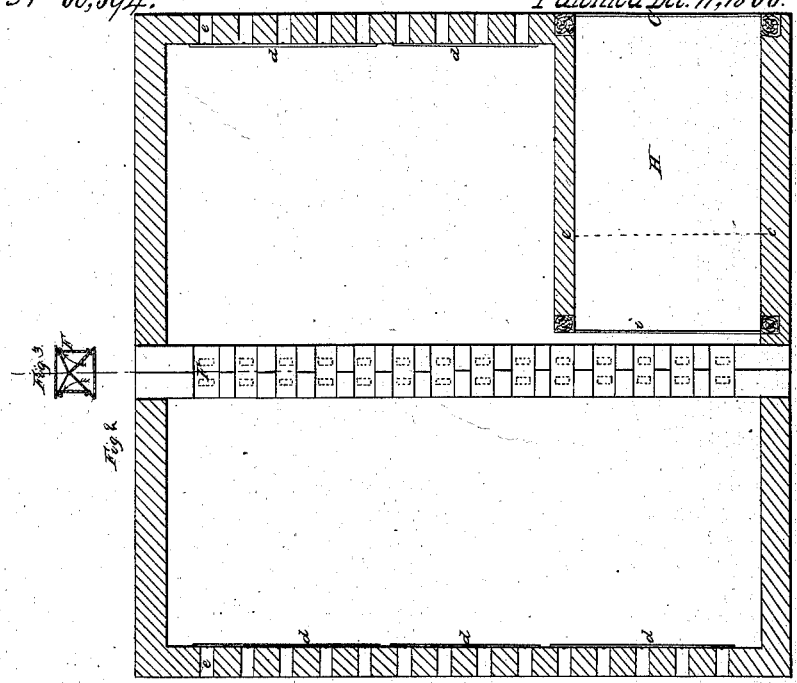
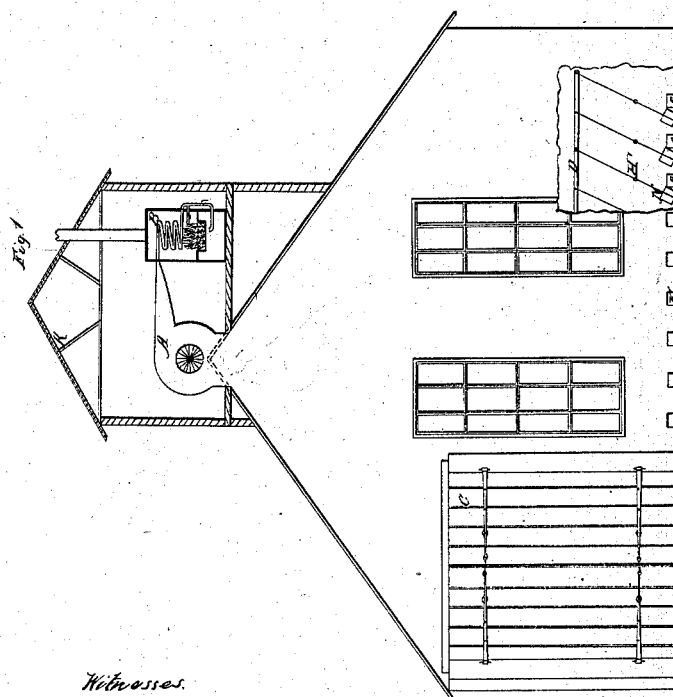
Witnesses.
Chas. J. Everett
Andy Broadway
Inventor.
Radcliffe B. Lockwood

United States Patent Office.

IMPROVED MODE OF DISINFECTING NOXIOUS VAPORS FROM RENDERING HOUSES, HOSPITALS, &c.

RADCLIFFE B. LOCKWOOD, OF NEW YORK, N. Y., ASSIGNOR TO LOCKWOOD & EVERETT, OF SAME PLACE.

Letters Patent No. 60,394, dated December 11, 1866.

The Schedule referred to in these Letters Patent, and making part of the same.

TO ALL WHOM IT MAY CONCERN:

Be it known that I, RADCLIFFE B. LOCKWOOD, of the city and county and State of New York, have invented a certain new and useful method of Disinfecting and Deodorizing the Noxious Gases or Vapors generated in Rendering Houses, Hospital Buildings, or Sewers; and I do hereby declare the following to be a full, clear, and exact description of the same, reference being had to the annexed drawing, making part of this specification, in which—

Figure 1 shows an elevation of a building with my invention applied thereto; and Figure 2 shows a ground plan of said building with said invention applied as aforesaid.

In rendering or slaughtering houses, hospitals, and buildings used for similar purposes, there are always more or less noxious and offensive gases or vapors generated, which is allowed to escape in the open atmosphere, making the neighborhood of such establishment unhealthy and the establishment itself a nuisance. To furnish a means of controlling, disinfecting, and deodorizing or consuming the gases as they escape from buildings of this kind, as well as sewers, is the object of this invention, which object I accomplish in the following manner, that is to say, I commence by making the building or house to be used for the business or purpose aforesaid, or either of them, as nearly tight as possible, so as to exclude the air from entering at any point excepting those especially provided for that purpose, by which means I can control the admission of fresh air to the building. I then arrange in connection with the upper part of the building or room used for the business or purpose aforesaid one or more openings of sufficient capacity to take off all the air admitted thereto, together with all the gas and vapors generated therein; by these means I am enabled to control the escape of the gases, air, or vapor from the room or building. Having thus provided a means of controlling the admission of the air and the escape of the air, noxious gases, and vapors, I next provide a means of deodorizing or disinfecting the said gases, which can only be done by disorganizing them either through the agency of intense heat, or by the use of chemical agents. To effect the disorganization or consumption of the gases through the agency of heat, I arrange in connection with the opening or openings aforesaid, in connection with the top of the building or room, a fan blower or air pump or some similar apparatus, which will draw the gases and air out of the room or building, and force it through a coil or pipe arranged over a furnace and so as to deliver into the fire, by which the gas and air is first superheated and then consumed. To disorganize these gases by the use of chemical agents I propose to blow or force them from the room or building, through a chamber filled with some good disinfectant or deodorizing agent, such as choleride of lime; for example, by means of pumps or blowers, arranged in connection with the escape opening the same as when the air is forced through the superheater.

The idea intended to be embodied by my invention, is controlling the admission of the air to the room or building used for the purpose aforesaid, and so controlling and treating the escaping air or gases or vapors, as to disinfect and deodorize them on their passage from the building to the atmosphere outside. The means, apparatus or contrivance, by which I have reduced this idea to practise, is shown in the drawing hereunto annexed. This drawing represents a square building fitted with a receiving room, H, in which a horse and cart burdened with dead animals or other offal may be driven; this room or chamber is provided with the doors, $i c$, both of which close tight enough to practically exclude the atmosphere; the door, c, being first opened to admit the horse and cart is closed after it, the door, $i$, is then opened and the team allowed to enter the building, by this means little or no gas can escape through the door from the building, and not sufficient air will be admitted to disturb the general atmosphere inside thereof. The windows, wall, and roof of the building are also made practically air-tight, excepting the flues, $e e$, made through the wall near the bottom to admit the air for ventillation. These flues are fitted with valves or covers, N, which valves are attached to levers suspended on pivots, H', set in the wall, the top of said levers being connected to the rod, D, by which a number of said valves can be opened or closed at once by moving said rod one way or the other as the case may require. These flues and valves are to regulate the admission of air to the building, and their number may be increased or diminished so as to supply what air may be necessary to thoroughly ventilate the building in case it can be thoroughly ventilated through flues made in the side walls. But in case the building is so large, and the draught towards the top thereof, induced by the blower, A, carries the air admitted through these flues up near the wall without disturbing the atmosphere in the centre of the building, it will be necessary to run one or more flues, F, all the way across the floor of the building, communicating with the out side of the wall. This flue should be made in the form of a triangle with holes cut in the two upper sides as shown by the arrows in fig. 3, and by dotted lines in fig. 2, and over this flue there should be arranged and secured a deflector as shown in fig. 3, so as to distribute the air through the building. The openings in the end of this flue should also be fitted with valves to regulate the admission of air thereto, the same as in the case of the other flues. The blower for drawing the air out of the building and forcing it through the superheater and into the fire, is shown by A, and is in this case arranged on the top of the building, where it is covered by a house, K. The blower delivers the air and gas into a coil of pipe fitted into a chamber, B, and arranged over a furnace in the manner shown, and is so constructed as to terminate under the furnace and deliver the gases either under the grate bars of the furnace, or over the fire through a branch pipe, r in the manner shown. For this blower, A, there may be substituted an air pump, to force the air through the superheater, and fire, or a tall chimney may be used to insure sufficient draught to draw the air, gases, and vapors through the superheater and fire; but whether one or the other of these devices be applied, the practise will be substantially the same, and will fall within the scope of my invention and patent, which I do not intend to confine to any particular make of apparatus, but in which I mean to include every variety of apparatus or method which is in substance the same as herein described.

In applying this invention to sewers, they (the sewers) should be made to deliver their noxious gases into a closed building or chamber to which the disinfecting and deodorizing apparatus may be applied and operated the same as shown in the drawing. It will of course be understood that in the practise of this invention in case a blower or pump be used instead of a chimney, steam or other convenient power is to be employed to drive the pump or blower as the case may be.

Having now described the nature of my invention and the manner of practising the same, I claim and desire to secure by Letters Patent—

Controlling, disinfecting, and deodorizing the noxious gases or vapors generated in rendering houses, slaughter houses, hospitals, or sewers, by forcing or drawing said gas or vapors from said building, houses or sewers, through a superhating or other furnace or through a chamber charged wiith a disinfecting and deodorizing material, by which said gases or vapors are disorganized and rendered innoxious and inodorous or are consumed.

RADCLIFFE B. LOCKWOOD.

Witnesses:
 CHAS. J. GOULTE,
 AMOS BROADNAX.